United States Patent [19]
Ziegelmeyer

[11] Patent Number: 4,582,461
[45] Date of Patent: Apr. 15, 1986

[54] PRECISION ROTATING TOOL MOUNTING DEVICE

[76] Inventor: Harold R. Ziegelmeyer, 5010 Griffin Creek Rd., Medford, Oreg. 97501

[21] Appl. No.: 532,102

[22] Filed: Sep. 14, 1983

Related U.S. Application Data

[63] Continuation of Ser. No. 291,514, Aug. 10, 1981.

[51] Int. Cl.⁴ ............................................. B23C 5/26
[52] U.S. Cl. .................................... 409/234; 51/168; 83/666; 144/90 R; 409/326
[58] Field of Search ................. 409/64, 231, 232, 234, 409/326, 11; 407/49; 51/168; 83/666; 144/90 R, 230; 403/259

[56] References Cited
U.S. PATENT DOCUMENTS
1,142,296  6/1915  Bellerose ............................. 51/168

FOREIGN PATENT DOCUMENTS
781418  11/1980  U.S.S.R. ............................. 403/259

*Primary Examiner*—Z. R. Bilinsky
*Attorney, Agent, or Firm*—Neil J. Driscoll

[57] ABSTRACT

The invention is the precise mounting of a cutting tool on a rotating spindle to prevent eccentric runout between the spindle and tool and comprises mating nonlocking taper surfaces at the inner end of the spindle tool combination and diverging angular taper surfaces at the outer end of the spindle and tool combination. A variable diameter wedge engages the diverging taper surfaces for precise and repeatable accurate mounting of the tool to the spindle.

6 Claims, 5 Drawing Figures

PRECISION ROTATING TOOL MOUNTING DEVICE

This application is a continuation of prior U.S. application Ser. No. 291,514, filed Aug. 10, 1981.

BACKGROUND OF THE INVENTION

1. Field of the Invention

The invention relates to a mode of precisely mounting a tool, such as a cutting tool, in a fixed manner to a rotating spindle and to eliminate any eccentric runout between the spindle and the precisely mounted tool.

2. Description of the Prior Art

It will be understood that the disclosed mode of precisely mounting the rotating tool to a rotating spindle may be utilized in many areas of manufacture. However, the disclosed invention does, in fact, have particular utility in the field of "finger jointing," that is, an area of activity where relatively small segments of lumber are precisely milled to provide an interfitting joint, which, through the use of adhesives, may provide wood products of larger and useful dimensional lengths. A particular cutting tool designed especially for finger jointing is disclosed in my U.S. Pat. No. 4,009,742, dated Mar. 1, 1977. In any event, persons skilled in the finger jointing art are aware that useful products can only be produced where the cutting head is precisely rotated in space so that joints of precise structure are created which will provide a uniform and precision interfit between subsequently joined pieces.

Conical mounting arrangements generally have been known in the art. For example, U.S. Pat. No. 3,951,477, dated Apr. 20, 1976, teaches a general mounting arrangement which comprises a pair of opposed cone surfaces on a first member of the arrangement in juxtaposition with opposed cone-shaped depression on a second segment of the arrangement which provide bearing and supporting surfaces. It is also generally known to provide conical surfaces on a rotating member and using those surfaces in a locking or non-locking mode to support a rotating element or tool. U.S. Pat. No. 819,824 dated May 8, 1906, teaches a driven axle 28 having a tapered or conical segment supporting a wheel and including a split ring 54 having an inner cone complimenting the taper and which performs a wedging action to tightly mount the wheel thereto.

Furthermore, it is state of the art practice in the finger jointing industry, to provide cutting heads having mounting bores with outwardly flaring tapered surfaces at the inner and outer extremities of the head. Annular collars in these arrangements, each having outwardly facing conical or tapered surfaces, are slideably mounted on a rotating spindle and complimentally engage the conical surfaces on the cutting heads at the inner and outer aspects of that head. The structure now being described is reminiscent of that shown in U.S. Pat. No. 3,951,477 referenced above. The structures are specifically known in the industry as removable self-centering collets.

SUMMARY OF THE INVENTION

It is the purpose and object of the invention to provide a spindle and cutting tool assembly wherein the tool is precisely positioned on the spindle in such a manner as to completely eliminate eccentric runout between the spindle and the cutting head during rotation of the assembly.

It is a specific object of the invention to achieve precision mounting of the tool on the spindle as described above by the provision of a cutting head having a central bore with annular inwardly facing conical surfaces at opposed ends of the bore which overlie, in assembled relationship, annular tapered surfaces formed on the spindle in angular relation with the axis of spindle rotation and which face in a common direction toward the outer extremity of the spindle. The annular taper at the inner aspect of the spindle is in direct engagement with the annular conical surface at the inner aspect of the cutting head while the annular aligning taper at the outer aspect of the spindle is in spaced relationship with the conical surface at the outer aspect of the cutting head which defines there between an annular volume adapted to be filled by a radially expansible and contractible wedge element which engages both the spindle and the cutting head and thereby precisely aligns the cutting head on the spindle and in determined relation to the axis of rotation of the spindle.

It will be understood by those skilled in the art that any conventional locking device may be utilized to hold the cutting head in position on the spindle. However, a particularly useful locking arrangement which is entirely compatible with the invention herein disclosed is shown and described in my application filed Apr. 23, 1981, and entitled "Force Multiplying Locking Arrangement."

These and other objects and advantages of the invention will become apparent in the course of the following description and explanation of a presently preferred embodiment of the invention.

DESCRIPTION OF THE PREFERRED EMBODIMENT

Figure 1:
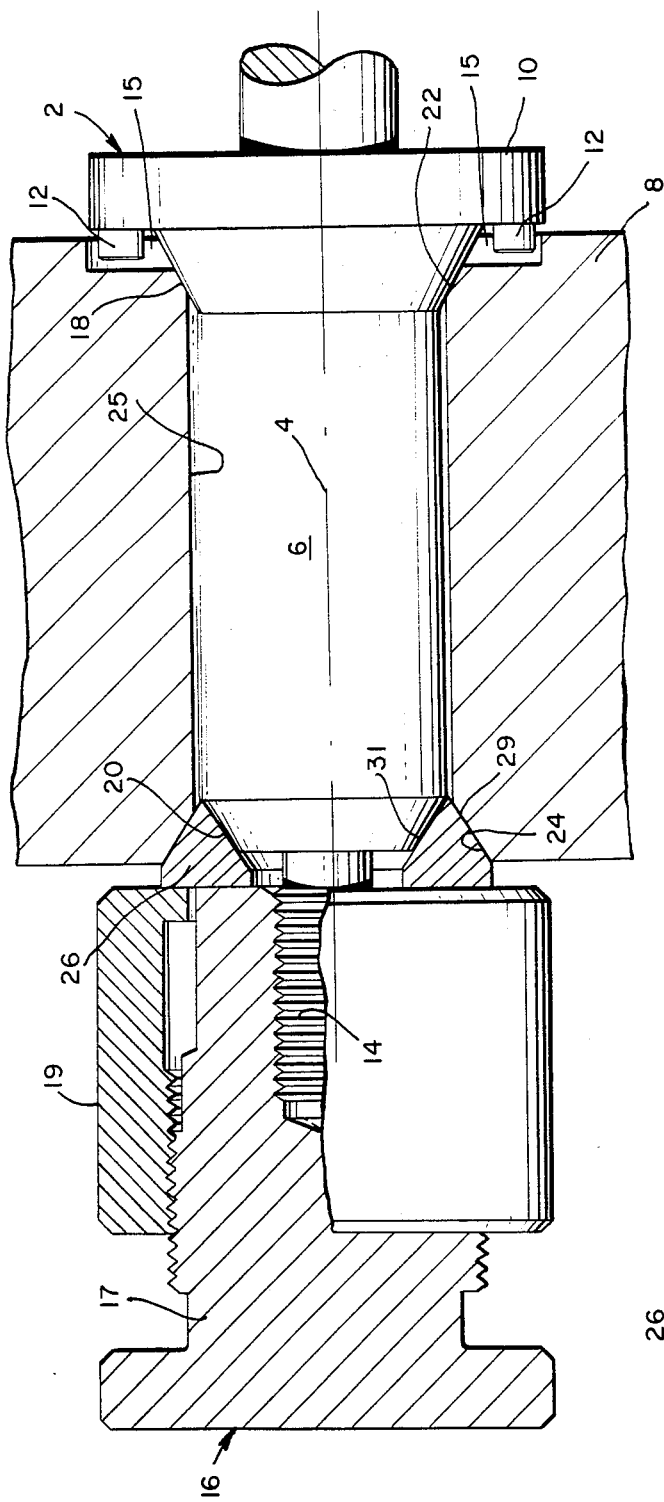
FIG. 1 is a vertical sectional view, partly in elevation, of a spindle and cutting head arrangement disclosing the invention.

Directing attention to the drawings, the numeral 2 indcates a spindle which is mounted, in a conventional manner not shown, for accurate rotation about its axis indicated by the centerline 4. Spindle 2 has a tool mounting segment 6 which is adapted to carry any conventional cutting equipment and which is shown schematically at 8. The spindle 2 is provided with an integral driving flange which includes drive pins 12,12 cooperatively disposed in key slots 15,15 whereby the tool 8 will rotate at high speed concurrently with the rotation of the spindle 2.

At its left terminus the spindle 2 is provided with a threaded projection or segment 14 which is adapted to receive an assembly locking arrangement indicated generally at 16. The locking arrangement 16 may comprise the main body 17 having a central aperture internally threaded to cooperatively mount on threaded projection 14. The main body 17 threadably carries locking nut 19 which will suffice to hold the entire arrangement together. Again, it is noted, however, that the force multiplying and locking arrangement disclosed in my reference application may be used for this purpose.

To accommodate precision mounting of the cutting head 8 on the spindle 6 an annular taper or conical alignment surface 18 is formed at the inner aspect of the spindle. A second alignment surface 20 is formed in the spindle adjacent the outer aspect thereof again as an annular taper or cone, it being understood that the alignment surfaces 18 and 20 are in angular relation to the axis of rotation 4 of the spindle 2. The cutter head 8 is provided with precisely formed annular conical areas, 22 and 24, adjacent the inner and outer aspects of the cutter bore 25.

Figure 2:
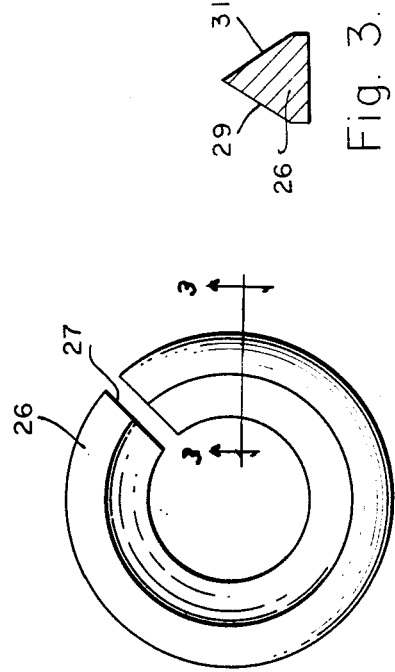
FIG. 2 is a plan view of a wedge element which may be utilized in the invention.

In the spindle-cutting head assembly the alignment surface 18 is in intimate engagement with the conical area 22 and the alignment surface 20 defines, with the conical area 24, an annular volume in which is disposed a wedge element 26. The wedge element 26 is provided with the wedge faces 29 and 31 which are in intimate engagement with the alignment surface 20 and the conical area 24. As the locking arrangement 16 drives the wedge element 26 inwardly of the arrangement it is necessary to provide means to allow wedge element 26 to expand and contract radially. For this purpose wedge element 26, as shown in FIG. 2, is slotted as is 27 which will allow radial variation.

Figure 5:
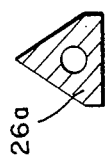
FIG. 5 is a sectional view taken along line 5—5 of FIG. 4.
Figure 3:
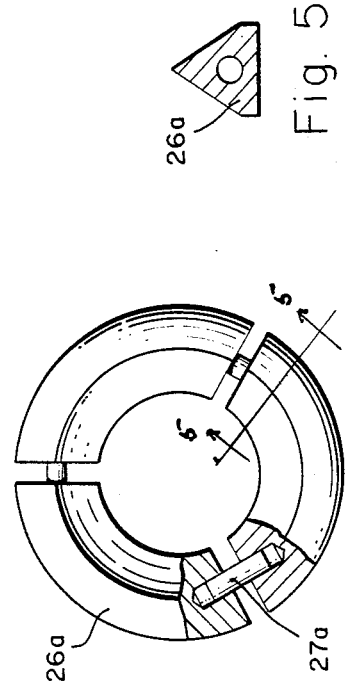
FIG. 3 is a sectional view taken along line 3—3 of the FIG. 2.
Figure 4:
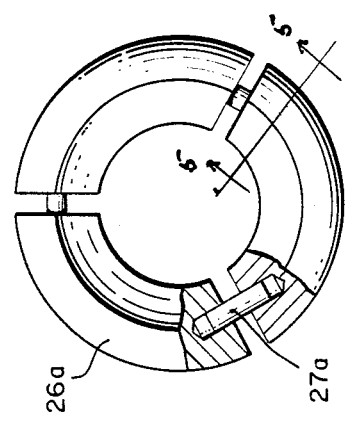
FIG. 4 is a plan view, fragmentarily sectioned, of an alternate wedge element that may be employed in the invention.

Alternately, the wedge element 26a shown in FIGS. 4 and 5 may be utilized. In this embodiment the wedge element 26a is formed of three identical segments which are joined by flexible elements, for example, elastomeric pins 27a, again allowing diametral variation in use.

From the above it will be readily apparent to those skilled in the art that precise and repeatable positioning of a cutting tool on a spindle has been achieved by the utilization of non-locking tapers in intimate face-to-face engagement, thus eliminating any possibility of eccentric runout between the spindle and cutting head during the arrangement operation, removal for sharpening and subsequent remounting.

Having described the presently preferred embodiment, it is understood that such description is by way of illustration and not limitation and that the described invention may be subject to certain modifications all within the spirit and scope thereof.

In the claim is claimed:

1. In a precision tool mounting arrangement including means to maintain arrangement assembly, the combination of
    a spindle having a precise axis of rotation,
    a tool having a bore adapted to receive the spindle,
    a first conical tool alignment surface on the spindle formed in acute angular relation to the axis of rotation,
    said first surface directly engaging said tool in a first conical area adjacent said bore,
    a second conical tool alignment surface formed on said spindle in spaced relation to said first alignment surface and defining a clearance volume with a second conical area of said tool adjacent said bore, and
    wedge means for filling said volume and concurrently directly pressure engage said second alignment surface and said second conical area in a non-locking manner and thereby precisely align said tool on said spindle and in a predetermined relation with said axis of rotation.

2. A precision tool mounting arrangement including means to maintain arrangement assembly according to claim 1, wherein
    said second alignment surface is in acute angular to said axis of rotation.

3. A precision tool mounting arrangement including means to maintain arrangement assembly according to claim 2, wherein
    said first and second alignment surfaces are annular tapers formed on said spindle and concurrently facing toward to outer extemof said spindle.

4. A precision tool mounting arrangement including means to maintain arrangement assembly according to claim 3, wherein said first and second areas are annular surfaces formed on said tool at the opposite ends of said bore and facing toward the central axis thereof.

5. A precision spindle and rotatable cutting head mounting arrangement including means to maintain arrangement assembly comprising,
    a spindle adapted to be rotatably driven about its longitudinal axis,
    a first outwardly directed taper in acute angular relation to said axis at the inner aspect of and on the spindle,
    a second outwardly directed taper in acute angular to said axis adjacent the outer aspect of and on the spindle,
    said cutting head having a central mounting bore adapted to receive the spindle,
    first and second inwardly directed head tapers at the inner and outer aspects of the bore,
    said first inwardly directed head taper adapted to directly engage said first outwardly directed taper on the spindle, and
    double angle cone means for non-lockingly pressure engaging said second outwardly and inwardly directed tapers on the spindle and head for precisely mounting the cutting head on the spindle.

6. A precision spindle and radial cutting tool head mounting arrangement including means to maintain arrangement assembly and according to claim 5, wherein
    said double angle cone means includes structural means accomodating the variation of the diameter of the cone means.

* * * * *